(12) United States Patent
Arsovski et al.

(10) Patent No.: US 9,759,767 B2
(45) Date of Patent: Sep. 12, 2017

(54) PRE-TEST POWER-OPTIMIZED BIN REASSIGNMENT FOLLOWING SELECTIVE VOLTAGE BINNING

(71) Applicant: GLOBALFOUNDRIES INC., Grandy Cayman (KY)

(72) Inventors: Igor Arsovski, Williston, VT (US); Jeanne P. Bickford, Essex Junction, VT (US); Paul J. Grzymkowski, Essex Juction, VT (US); Susan K. Lichtensteiger, Essex Junction, VT (US); Robert J. McMahon, Essex Juntion, VT (US); Troy J. Perry, Georgia, VT (US); David M. Picozzi, Ferrisburgh, VT (US); Thomas G. Sopchak, Williston, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 347 days.

(21) Appl. No.: 14/695,112

(22) Filed: Apr. 24, 2015

(65) Prior Publication Data
US 2016/0313394 A1  Oct. 27, 2016

(51) Int. Cl.
*G01R 31/00* (2006.01)
*G01R 31/28* (2006.01)
(Continued)

(52) U.S. Cl.
CPC ........ *G01R 31/2894* (2013.01); *G01R 21/133* (2013.01); *G01R 31/31718* (2013.01); *G06F 17/5045* (2013.01); *G06F 2217/78* (2013.01)

(58) Field of Classification Search
CPC .................................................. G01R 31/2894
See application file for complete search history.

(56) References Cited

U.S. PATENT DOCUMENTS

| 7,241,635 B1 | 7/2007 | Osann, Jr. |
| 7,475,366 B2 | 1/2009 | Kuemerle et al. |
| (Continued) | | |

OTHER PUBLICATIONS

Lichtensteiger et al, Using Selective Voltage Binning to Maximize Yield, IEEE Transactions on Semiconductor Manufacturing, vol. 26, No. 4, Nov. 2013.*

*Primary Examiner* — Daniel Miller
(74) *Attorney, Agent, or Firm* — Gibb & Riley, LLC; David A. Cain, Esq.

(57) ABSTRACT

Disclosed is a method wherein selective voltage binning and leakage power screening of integrated circuit (IC) chips are performed. Additionally, pre-test power-optimized bin reassignments are made on a chip-by-chip basis. Specifically, a leakage power measurement of an IC chip selected from a voltage bin can is compared to a bin-specific leakage power screen value of the next slower voltage bin. If the leakage power measurement is higher, the IC chip will be left in the voltage bin to which it is currently assigned. If the leakage power measurement is lower, the IC chip will be reassigned to that next slower voltage bin. These processes can be iteratively repeated until no slower voltage bins are available or the IC chip cannot be reassigned. IC chips can subsequently be tested according to testing parameters, including the minimum test voltages, associated with the voltage bins to which they are finally assigned.

11 Claims, 7 Drawing Sheets

(51) Int. Cl.
    *G01R 21/133*    (2006.01)
    *G06F 17/50*    (2006.01)
    *G01R 31/317*    (2006.01)

(56)  References Cited

U.S. PATENT DOCUMENTS

| | | |
|---|---|---|
| 8,421,495 B1 * | 4/2013 | Anemikos .......... H03K 19/0013 326/14 |
| 8,719,763 B1 | 5/2014 | Bickford et al. |
| 8,781,792 B2 | 7/2014 | Visweswariah et al. |
| 2011/0185334 A1 | 7/2011 | Iyer et al. |
| 2013/0113514 A1 | 5/2013 | Anemikos et al. |
| 2013/0124133 A1 | 5/2013 | Anemikos et al. |
| 2013/0326460 A1 | 12/2013 | Bickford et al. |
| 2014/0100799 A1 | 4/2014 | Bickford et al. |
| 2014/0316731 A1 | 10/2014 | Singh et al. |
| 2014/0380261 A1 | 12/2014 | Bickford et al. |

* cited by examiner

PRE-TEST POWER-OPTIMIZED BIN REASSIGNMENT FOLLOWING SELECTIVE VOLTAGE BINNING

BACKGROUND

The present disclosure relates to integrated circuit (IC) chip yield and, more particularly, to a method that improves IC chip yield by providing for pre-test power-optimized bin reassignment following selective voltage binning.

More particularly, total power consumption is a key concern of IC chip designers. Those skilled in the art will recognize that there are two components to total power consumption: dynamic power consumption and leakage power consumption. More specifically, dynamic power consumption refers to the amount of power required to operate an IC chip and is proportional to the value of the supply voltage (Vdd) squared and to the frequency of operation. Leakage power consumption refers to the amount of power consumed by the IC chip when it is inactive and is proportional to the value of the supply voltage (Vdd) and to the leakage current.

Additionally, designers have realized that process parameter variations have a significant impact on IC chip performance (e.g., on operating speed, as indicated by delay). Such process parameter variations are due to variations that occur during manufacturing and include, but are not limited to, variations in channel length, channel width, doping, spacer width, etc. The process window for an IC chip design (also referred to as the process distribution) refers to the performance range for IC manufactured according to the same design and operating using the same voltage supply. This performance range extends from relatively fast IC chips at one end of the process window (i.e., the "fast" end of the process window) to relatively slow IC chips at the opposite end of the process window (i.e., the "slow" end of the process window). An IC chip at the "fast" end of the process window may consume an excessive amount of dynamic power and/or leakage power (i.e., may violate a maximum total power constraint), whereas another IC chip at the "slow" end of the process window may not meet an IC chip performance requirement.

Selective voltage binning is a technique developed in order to reduce power consumption at the "fast" end of the process window, while increasing operating speed at the "slow" end of the process window. Specifically, in selective voltage binning, the process window for an IC chip design is divided into successive intervals and different voltage ranges are assigned to each successive interval such that relatively low voltage ranges are assigned to intervals at the "fast" end of the process window and relatively high voltage ranges are assigned to intervals at the "slow" end of the process window. Subsequently, based on performance measurements (e.g., delay measurements), the IC chips manufactured according to the IC chip design are assigned to different groups, which are referred to as voltage bins and which correspond to the successive intervals, described above. This process of assigning the IC chips to the different groups or, more particularly, to the voltage bins is referred to as selective voltage binning. When such IC chips are shipped for incorporation into products, the voltage ranges associated their respective voltage bins are noted. Operation of relatively fast IC chips at lower voltage ranges minimizes worst-case power consumption and operation of relatively slow IC chips at higher voltage ranges improves their performance (e.g., increases their operating speed/reduces their delay).

One drawback to selective voltage binning, however, is that, once IC chips are assigned to the different voltage bins, as described above, they are tested and that testing is performed at a bin-specific minimum test voltage. The bin-specific minimum test voltage can, for example, be equal to the minimum voltage (Vmin) of the voltage range assigned to the voltage bin. Alternatively, in order to guarantee proper timing even during worst-case voltage drop events, the bin-specific minimum test voltage can be equal to the minimum voltage (Vmin) of the voltage range assigned to the voltage bin less some predetermined margin (also referred to herein as a guardband voltage). However, because, at low voltages, some IC chips exhibit relatively high sensitivity to process parameter variations that can lead to performance fails, testing of integrated circuit chips at such bin-specific minimum test voltages can have a significant impact on IC chip yield.

SUMMARY

In view of the foregoing disclosed herein are a method and an associated computer program product for improving integrated circuit (IC) chip yield by providing for pre-test power-optimized bin reassignment following selective voltage binning. In the method, IC chips can be manufactured according to a given design and selective voltage binning and leakage power screening of those chips can be performed. Additionally, pre-test power-optimized bin reassignments can be made on an IC chip-by-IC chip basis. Specifically, a leakage power measurement of an IC chip, which is selected from a voltage bin, can be compared to the bin-specific leakage power screen value of the next slower voltage bin. If the leakage power measurement is higher, the IC chip can be left in the voltage bin to which it is currently assigned. If the leakage power measurement is lower, the IC chip can be reassigned to that next slower voltage bin. These processes can be iteratively repeated until no slower voltage bins are available or until the IC chip cannot be reassigned due to its leakage power measurement. IC chips can subsequently be tested according to the testing parameters (e.g., minimum test voltages) that are associated with the voltage bins to which they are finally assigned. Reassignment to slower voltage bins in this manner allows IC chips to be tested at higher minimum test voltages, while minimizing the risk of violating a maximum total power constraint.

More particularly, disclosed herein is a method that improves integrated circuit chip yield by providing for pre-test power-optimized bin reassignment following selective voltage binning so that integrated circuit (IC) chips may be tested at high minimum voltages.

Specifically, the method can comprise performing selective voltage binning. That is, multiple different voltage bins can be defined such that each voltage bin is associated with a corresponding performance range. For example, the voltage bins can comprise a first voltage bin, which is associated with a first performance range; a second voltage bin, which is associated with a second performance range that is slower than the first performance range; and, optionally, one or more additional voltage bins associated with additional performance ranges (e.g., a third voltage bin associated with a third performance range and so on). Based on previously taken performance measurements, IC chips can be assigned to the different voltage bins.

The method can further comprise performing bin-specific leakage power screening. That is, the multiple different voltage bins can further be defined such that each voltage bin is associated with a corresponding leakage power screen value. For example, the first voltage bin can be associated with a first leakage power screen value, the second voltage bin can be associated with a second leakage power screen value that is lower than the first leakage power screen value and any additional voltage bins can be associated with additional leakage power screen values (e.g., a third voltage bin can be associated with a third leakage power screen value that is lower than the second leakage power screen value and so on). Based on previously taken leakage power measurements and the bin-specific leakage power screen values, determinations can be made as to whether or not to scrap individual chips. For example, any IC chips initially assigned to the first voltage bin and having a leakage power measurement above the first leakage power screen value can be scrapped, any IC chips initially assigned to the second voltage bin and having a leakage power measurement above the second leakage power screen value can be scrapped and so on.

The method can further comprise making pre-test power-optimized voltage bin reassignments. That is, for each selected IC chip, a determination can be made as to whether or not there are any slower voltage bins into which the selected IC chip could possibly be reassigned. If not, the selected IC chip will be left in the voltage bin to which it is currently assigned. If so, a determination can be made as to whether or not to reassign the selected IC chip to the next slower voltage bin. Specifically, a determination can be made as to whether a leakage power measurement taken from the selected IC chip is greater than a bin-specific leakage power screen value of the next slower voltage bin. If so, the IC chip will be left in the voltage bin to which it is currently assigned. If not, the IC chip will be assigned to that next slower voltage bin. These processes can be iteratively repeated until no other slower voltage bins are available for possible reassignment or until a determination is made that, based on the leakage power measurement of the selected IC chip as compared to the leakage power screen value of the next slower voltage bin, the selected IC chip can not be further reassigned. Then, the same processes are repeated for each of the other manufactured IC chips.

More specifically, for an IC chip selected from the first voltage bin, a determination can be made that there are slower voltage bins into which that selected IC chip could possibly be reassigned. When there is at least one slower voltage bin available (e.g., the second voltage bin and so on) into which the selected IC chip could possibly be reassigned, a determination can be made as to whether or not to reassign the selected IC chip from the first voltage bin to the next slower voltage bin (e.g., to the second voltage bin) based on a comparison of the first leakage power screen value associated with the first voltage bin to a leakage power measurement taken from that selected IC chip and further based on a comparison of the second leakage power screen value associated with the second voltage bin to the leakage power measurement. In this case, when the leakage power measurement is less than the first leakage power screen value associated with first voltage bin and greater than the second leakage power screen value associated with the second voltage bin, the selected IC chip will be left in the first voltage bin. However, when the leakage power measurement is less than both the first leakage power screen value of the first voltage bin and the second leakage power screen of the second voltage bin, the IC chip will be reassigned to the second voltage bin. When the IC chip is reassigned to the second voltage bin, these processes can be iteratively repeated. That is, another determination can be as to whether or not there are any slower voltage bins into which the IC chip could possibly be reassigned. If there were no slower voltage bins into which the IC chip could possibly be reassigned, the IC chip would be left in the second voltage bin. However, when there is at least one slower voltage bin available (e.g., the third voltage bin and so on) into which the IC chip could possibly be reassigned, a determination can be made as to whether or not to reassign the IC chip from the second voltage bin to the next slower voltage bin (e.g., the third voltage bin) based on a comparison of the third leakage power screen value associated with the third voltage bin to the leakage power measurement. In this case, if the leakage power measurement of the IC chip is greater than the third leakage power screen value associated with the third voltage bin, the IC chip will be left in the second voltage bin. However, if the leakage power measurement of the IC chip is less than the third leakage power screen value associated with the third voltage bin, the IC chip will be reassigned to the third voltage bin. Again, these processes can be iteratively repeated until no other slower voltage bins are available for possible reassignment or until a determination is made that, based on the leakage power measurement of the IC chip as compared to the leakage power screen value of the next slower voltage bin, the IC chip can not be further reassigned. Then, the same processes are repeated for each of the other manufactured IC chips.

The method can further comprise subsequently testing the IC chips according to testing parameters associated with the voltage bins to which they are finally assigned.

Also disclosed herein is a computer program product. The computer program product can comprise a computer readable storage medium having program instructions embodied therewith. The program instructions can be executable by a computer to cause the computer to perform the above-described method.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, one drawback to selective voltage binning, however, is that, once IC chips are assigned to the different voltage bins, as described above, they are tested and that testing is performed at a bin-specific minimum test voltage. The bin-specific minimum test voltage can, for example, be equal to the minimum voltage (Vmin) of the voltage range assigned to the voltage bin. Alternatively, in order to guarantee proper timing even during worst-case voltage drop events, the bin-specific minimum test voltage can be equal to the minimum voltage (Vmin) of the voltage range assigned to the voltage bin less some predetermined margin (also referred to herein as a guardband voltage). However, because, at low voltages, some IC chips exhibit relatively high sensitivity to process parameter variations that can lead to performance fails, testing of integrated circuit chips at such bin-specific minimum test voltages can have a significant impact on IC chip yield.

In view of the foregoing disclosed herein are a method and an associated computer program product for improving integrated circuit (IC) chip yield by providing for pre-test power-optimized bin reassignment following selective voltage binning. In the method, IC chips can be manufactured according to a given design and selective voltage binning and leakage power screening of those chips can be performed. Additionally, pre-test power-optimized bin reassignments can be made on an IC chip-by-IC chip basis. Specifically, a leakage power measurement of an IC chip, which is selected from a voltage bin, can be compared to the bin-specific leakage power screen value of the next slower voltage bin. If the leakage power measurement is higher, the IC chip can be left in the voltage bin to which it is currently assigned. If the leakage power measurement is lower, the IC chip can be reassigned to that next slower voltage bin. These processes can be iteratively repeated until no slower voltage bins are available or until the IC chip cannot be reassigned due to its leakage power measurement. IC chips can subsequently be tested according to the testing parameters (e.g., minimum test voltages) that are associated with the voltage bins to which they are finally assigned. Reassignment to slower voltage bins in this manner allows IC chips to be tested at higher minimum test voltages, while minimizing the risk of violating a maximum total power constraint.

Figure 1:
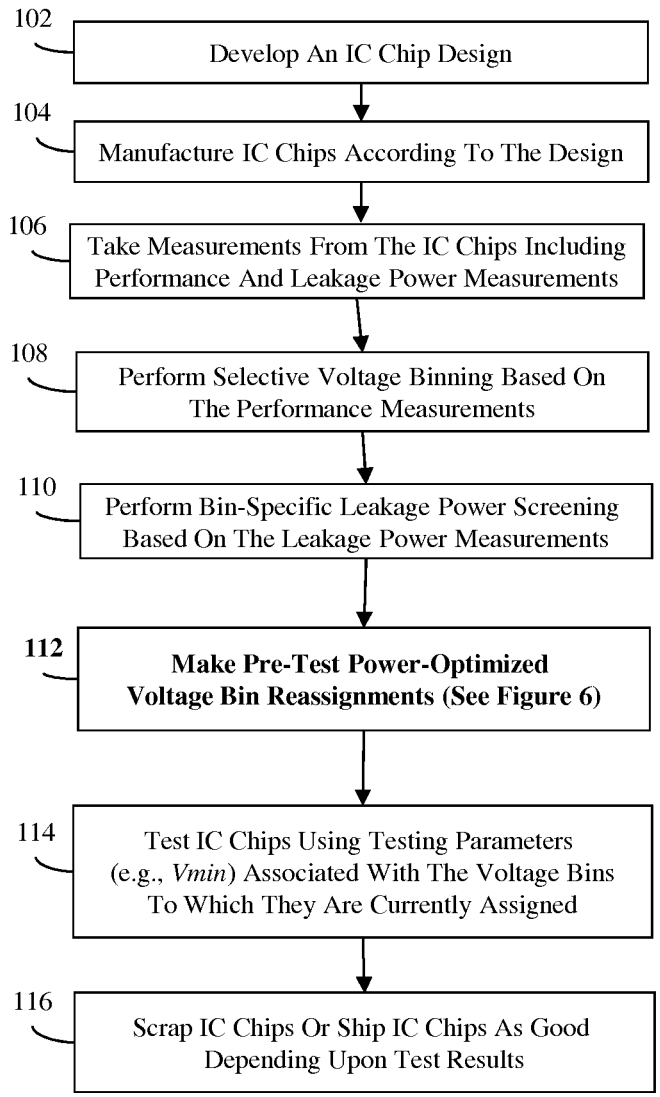
FIG. 1 is a flow diagram illustrating a method that improves integrated circuit (IC) chip yield by providing for pre-test power-optimized bin reassignment following selective voltage binning.

More particularly, referring to the flow diagram of FIG. 1, disclosed herein is a method that improves integrated circuit (IC) chip yield by providing for pre-test power-optimized bin reassignment following selective voltage binning.

Specifically, the method can comprise developing a design for an integrated circuit (IC) chip (102) and manufacturing IC chips according to that design (104). Those skilled in the art will recognize that the IC chip design developed at process 102 will set out specifications for various parameters (e.g., for channel length, channel width, doping, spacer width, etc.). However, the actual values of those parameters may vary due to manufacturing process variations and, as a result, may impact the performance (e.g., operating speed, as indicated by delay) of manufactured IC chips.

The method can further comprise taking measurements from the IC chips (106). The measurements can include, but are not limited to, performance measurements, such as delay measurements, and leakage power measurements. Various different techniques for measuring performance (e.g., delay) and for measuring leakage power are well known in the art and, thus, descriptions of such techniques are omitted from this specification in order to allow the reader to focus on the salient aspects of the disclosed method.

Figure 2:
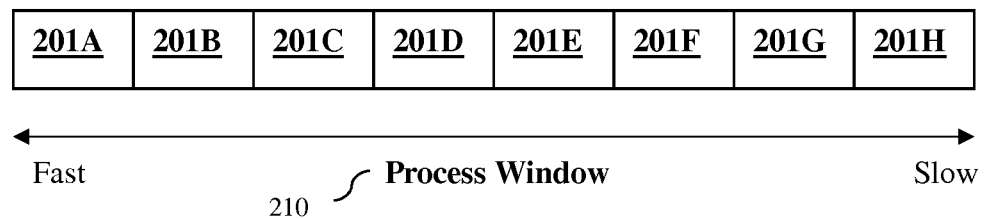
FIG. 2 is a graph illustrating an exemplary process window divided into successive intervals corresponding to voltage bins.

The method can further comprise performing selective voltage binning of the IC chips based on the performance measurements taken at process 106 (108). Specifically, as mentioned above, selective voltage binning is a technique developed in order to reduce power consumption at the "fast" end of the process window and to increase operating speed at the "slow" end of the process window. In order to perform selective voltage binning, the process window of the IC chip design must be defined. That is, given the condition that all IC chips are operated using the same supply voltage, the full performance range of the IC chip design can be defined from the fastest IC chips (e.g., from 3-sigma fast IC chips) relative to IC chips with a nominal operating speed to the slowest IC chips (e.g., −3-sigma slow IC chips) relative to IC chips with the nominal operating speed. This process window can be defined pre-manufacture based on a best case/worst case analysis. Alternatively, this process window can be defined post-manufacture based on actual performance measurements taken from the manufactured IC chips. In any case, as illustrated in FIG. 2, the process window 210 can be divided into successive intervals (which as discussed in greater detail below will correspond to the voltage bins 201 used in the selective voltage binning process). For illustration purposes, eight successive intervals corresponding to eight successive voltage bins 201A-201H are shown in FIG. 2 with the first interval (see the first voltage bin 201A) corresponding to the fastest IC chips in the process window 210 and the last interval (see the last voltage bin 201H) corresponding to the slowest IC chips in the process window 210. However, it should be understood that the process window 210 could, alternatively, be divided into any number of two or more successive intervals.

Once the process window 210 is divided into the successive intervals, different voltage ranges 301, which are defined by a minimum voltage (Vmin) and a maximum voltage (Vmax), can be assigned to each successive interval (e.g., see voltage ranges 301A-301H assigned to the successive intervals, which correspond to the voltage bins 201A-201H, respectively). The voltage ranges 301 can specifically be assigned such that relatively low voltage ranges are assigned to intervals at the "fast" end of the process window 210 in order to minimize the chance of violating a total maximum power constraint. The voltage ranges 301 can further specifically be assigned such that relatively high voltage ranges are assigned to intervals at the "slow" end of the process window 210 in order to achieve a specific performance goal (e.g., to increase operating speed).

Figure 3:
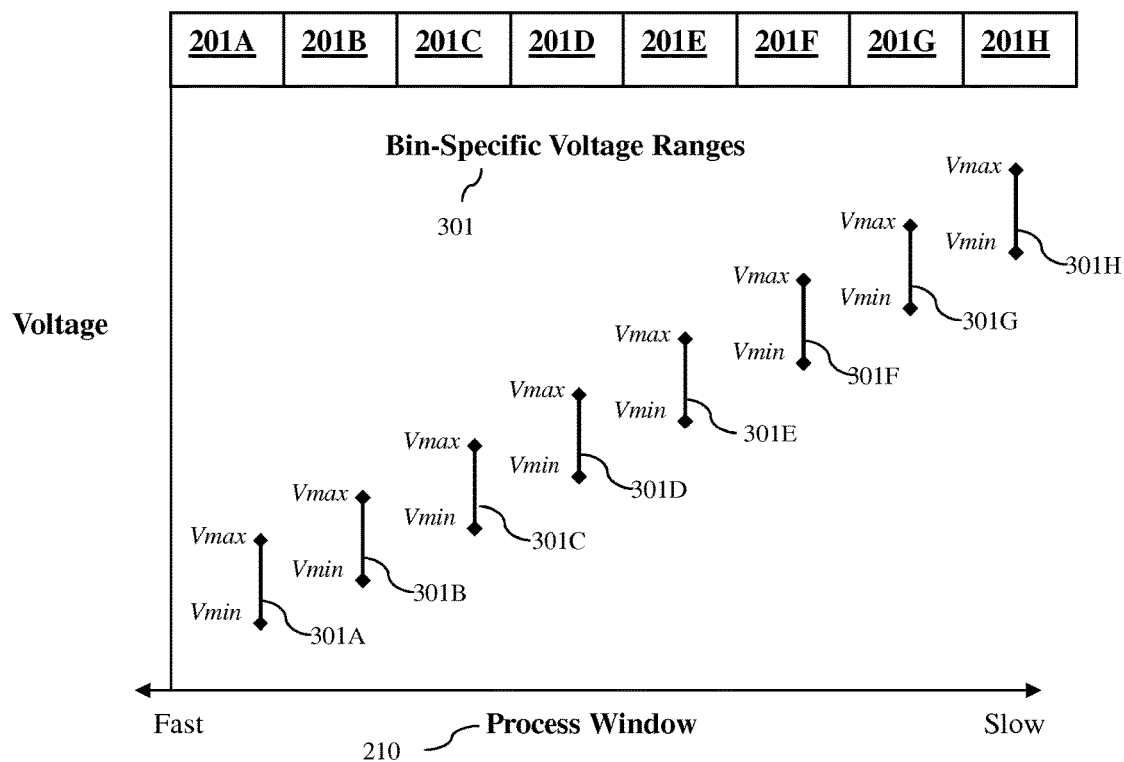
FIG. 3 is a graph illustrating the exemplary process window of FIG. 2 and showing the voltage ranges associated with the voltage bins, respectively, within the process window.

Based on the performance measurements taken at process 106, the IC chips can, at process 108, be assigned to (i.e., sorted into) different groups, which are referred to as voltage bins 201A-201H and which correspond to the successive intervals of the process window 210 discussed above. Since the voltage bins 201A-201H do correspond to the successive intervals, each of the voltage bins is similarly associated with a corresponding performance range within the process window 210 and a corresponding voltage range 301A-301H, respectively. Thus, for example, referring to FIG. 3, the voltage bins can comprise: a first voltage bin 201A, which is associated with a first performance range and with a first voltage range 301A; a second voltage bin 201B, which is associated with a second performance range that is slower than the first performance range and with a second voltage range 301B that is higher than the first voltage range 301A; and, optionally, one or more additional voltage bins, such as a third voltage bin 201C, which is associated with a third performance range that is slower than the second performance range and with a third voltage range 301C that is higher than the second voltage range, and so on. Various different techniques for defining the process window of an IC chip design, dividing that process window into successive intervals and assigning voltage ranges to the intervals, as described above, are well known in the art (e.g., see U.S. Pat. No. 8,719,763 of Bickford et al. issued on May 6, 2014 and U.S. Pat. No. 7,475,366 of Kuemerle et al. issued on Jan. 6, 2009, both of which are incorporated herein by reference in their entirety). Thus, the details of such techniques are omitted from this specification in order to allow the reader to focus on the salient aspects of the disclosed method.

Figure 4:
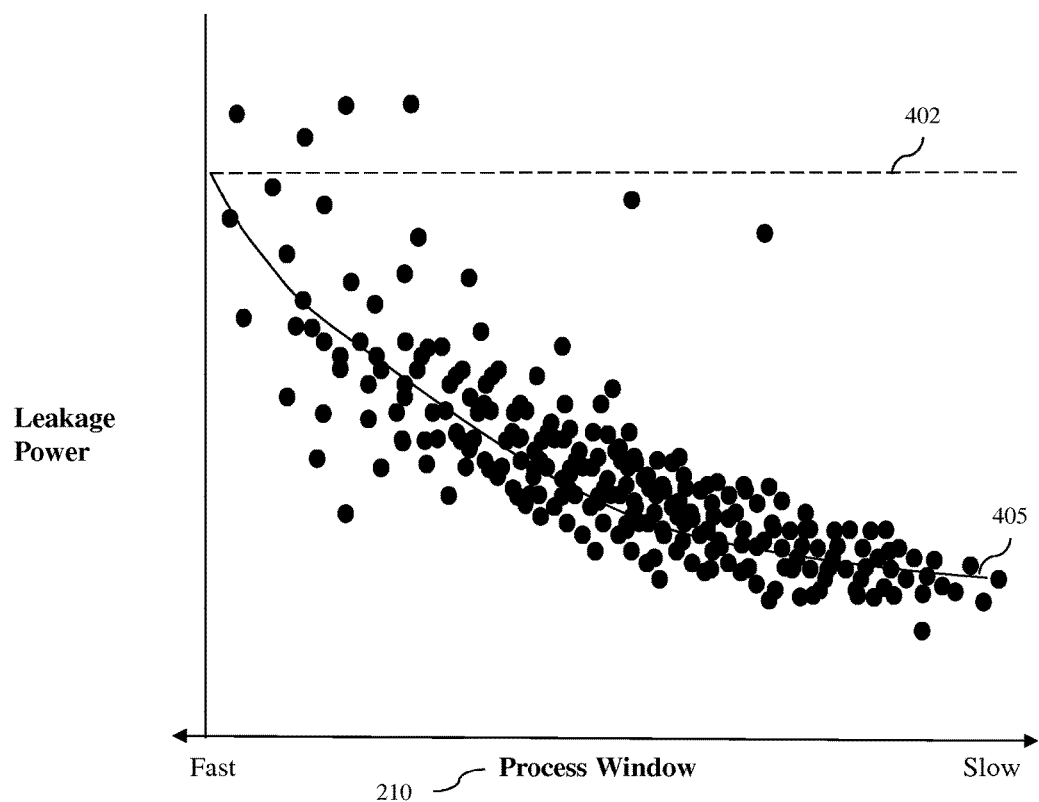
FIG. 4 is a graph illustrating the exemplary process window of FIG. 2 and showing leakage power data points within the process window.

The method can further comprise performing bin-specific leakage power screening of the IC chips based on the leakage power measurements taken at process 106 (110). Specifically, as discussed in U.S. Patent Application Publication No. 2014/0100799 of Bickford et al., published on Apr. 10, 2014 and incorporated herein in its entirety by reference, oftentimes a fixed leakage power screen value is determined based on the leakage current of IC chips in the fastest voltage bin (i.e., the voltage bin at the "fast" end of the process window). Any IC chips within the process window and having a leakage power measurement above this fixed leakage power screen value are scrapped. The leakage current of IC chips in the fastest voltage bin is used to determine the fixed leakage power screen value because it is assumed IC chips in slower voltage bins will have lower leakage current amounts. However, this is not always the case. For example, as illustrated in FIG. 4, a majority of leakage power data points will typically be grouped in a single band 405, which is below a fixed leakage power screen value 402; however, some leakage power data points may be outliers contained in the region between the band 405 and the fixed leakage power screen value 402 (referred to as the "total power exposure region"). IC chips that fall within this total power exposure region may be placed in a voltage bin associated with a relatively high voltage range during selective voltage binning at process 108 and, when operated at that high voltage range, may exhibit a maximum total power consumption that is above a maximum total power constraint.

Figure 5:
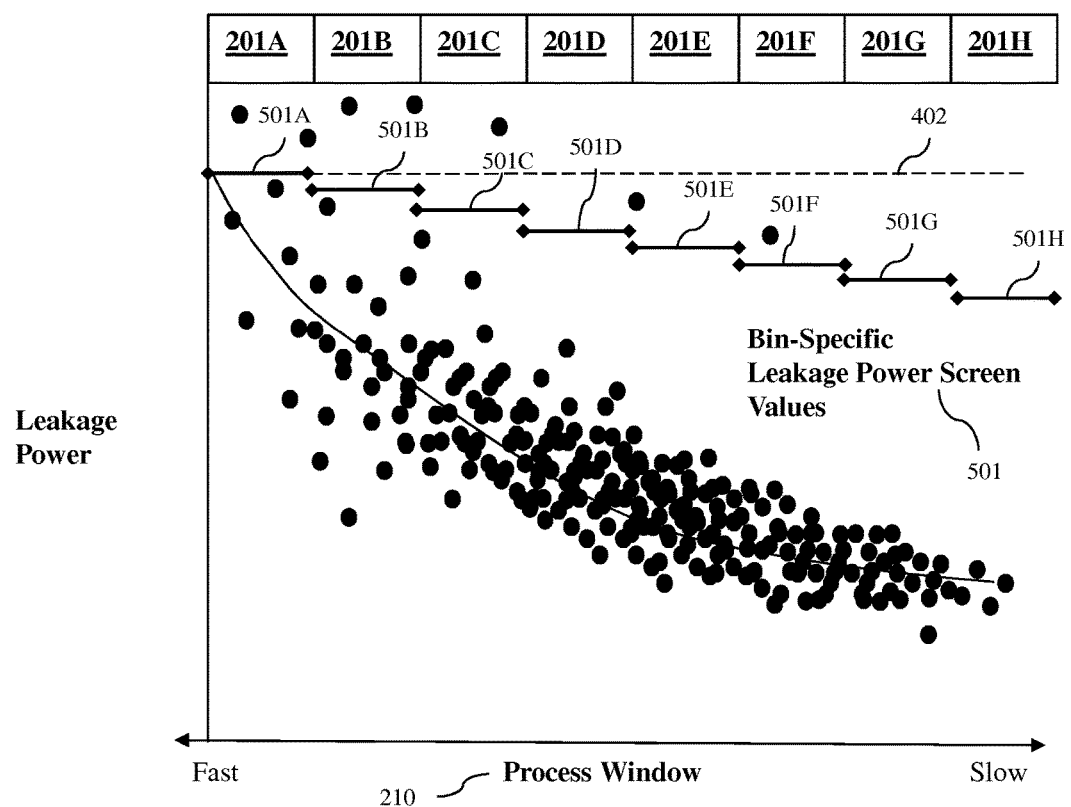
FIG. 5 is a graph illustrating the exemplary process window of FIG. 2, showing the leakage power data points of FIG. 4 and further showing leakage power screen values associated with the voltage bins, respectively, within the process window.

In order to avoid violating a maximum total power constraint in this manner, bin-specific leakage power screen values can be associated with each voltage bin. Specifically, relatively high leakage power screen values can be associated with voltage bins at the "fast" end of the process window and relatively low leakage power screen values can be associated voltage bins at the "slow" end of the process window. Thus, for example, as illustrated in FIG. 5, the different voltage bins 201A-201H can be associated with different leakage power screen values 501. That is, the first voltage bin 201A, which is at the "fast" end of the process window 210, can be associated with a first leakage power screen value 501A that is equal to the fixed leakage power screen value 402. The second voltage bin 201B, which has a slower performance range than the first voltage bin 201A, can be associated with a second leakage power screen value 501B that is lower than the first leakage power screen value 501A. The third voltage bin 201C, which has a slower performance range than the second voltage bin 201B, can be associated with a third leakage power screen value 501C that is lower than the second leakage power screen value 501B, and so on. It should be noted that, for illustration purposes, FIG. 5 shows each voltage bin 201A-201H being associated with a different leakage power screen value 501A-501H, respectively, with 501A representing the highest leakage power screen value and 501H representing the lowest leakage power screen. However, it should be understood that FIG. 5 is not intended to be limiting. That is, the number of leakage power screen values could be different from the number of voltage bins. For example, every n (e.g., where n=2 or n=4) adjacent voltage bins within the process window could have the same leakage power screen value.

In any case, based on the leakage power measurements taken at process 106 and the bin-specific leakage power screen values 501 described above and illustrated in FIG. 5, determinations can be made at process 110 as to whether or not to keep or scrap individual IC chips. That is, during leakage power screening at process 110, all IC chips having a leakage power measurement above the leakage power screen value 402 would be screened out (i.e., scrapped). Additionally, any IC chip having a leakage power measurement above the bin-specific leakage power screen value for the specific voltage bin to which it was assigned at process 108 would also be screened out (i.e., scrapped).

The method can further comprise making pre-test power-optimized voltage bin reassignments using these same bin-specific leakage power screen values discussed above and used at process 110 (112). Specifically, referring to the flow diagram of FIG. 6, for each selected IC chip, a determination can be made as to whether or not there are any slower voltage bins into which the selected IC chip could possibly be reassigned (602). It should be noted that, "a slower voltage bin" refers to a voltage bin with IC chips having a slower performance range relative to the performance range of IC chips in another voltage bin. Contrarily, "a faster voltage bin" refers to a voltage bin with IC chips having a faster performance range relative to the performance range of IC chips in another voltage bin. In any case, if no slower voltage bin is available, the selected IC chip will be left in the voltage bin to which it is currently assigned (608). If at least one slower voltage bin is available, a determination can be made as to whether or not to reassign the selected IC chip to the next slower voltage bin. Specifically, a determination can be made as to whether the leakage power measurement taken from the selected IC chip at process 106 is greater than the bin-specific leakage power screen value of the next slower voltage bin. If so, the selected IC chip will be left in the voltage bin to which it is currently assigned (608). If not, the selected IC chip will be reassigned to that next slower voltage bin (606). These processes (602)-(608) can be iteratively repeated until no other slower voltage bins are available for possible reassignment or until a determination is made that, based on the leakage power measurement of the selected IC chip as compared to the leakage power screen value of the next slower voltage bin, the selected IC chip can not be further reassigned. Then, the same processes are repeated for each of the other manufactured IC chips.

Figure 6:
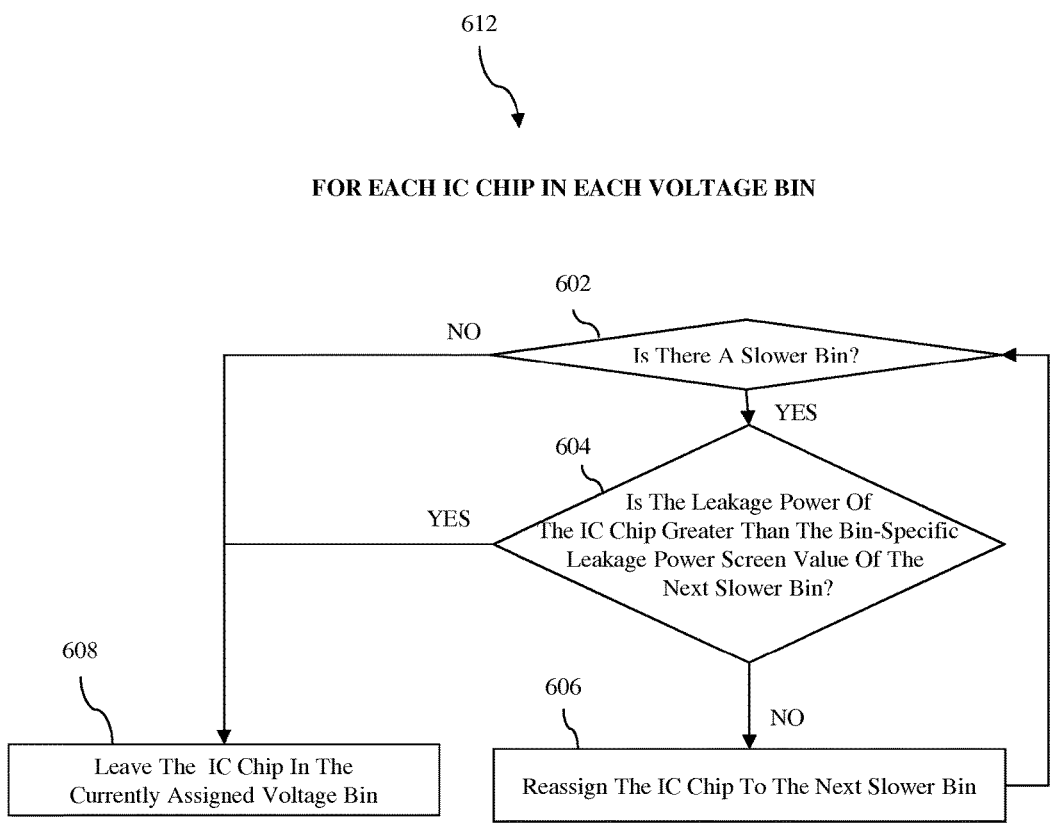
FIG. 6 is a flow diagram illustrating in greater detail the process 112 of the flow diagram of FIG. 1; and, FIG. 7 is a schematic diagram illustrating a representative hardware environment for practicing disclosed method.

More specifically, referring to FIG. 5 in combination with the flow diagram of FIG. 6, for an IC chip selected from the first voltage bin 201A, a determination can be made at process 602 as to whether or not there are slower voltage bins into which that IC chip could possibly be reassigned. In this case, the second voltage bin 201B, the third voltage bin 201C and so on are all possible candidates for bin reassignment. When there is at least one slower voltage bin available (e.g., the second voltage bin 201B and so on) into which the IC chip could possibly be reassigned, a determination can be made as to whether or not to reassign the IC chip from the first voltage bin 201A to the next slower voltage bin, which in this case is the second voltage bin 201B. This determination is made based on a comparison of the first leakage power screen value 501A associated with the first voltage bin 201A to a leakage power measurement taken from that IC chip at process 106 and further based on a comparison of the second leakage power screen value 501B associated with the second voltage bin 201B to the leakage power measurement. If a determination is made at process 604 that the leakage power measurement of the IC chip is less than the first leakage power screen value 501A associated with first voltage bin 201A and greater than the second leakage power screen value 501B associated with the second voltage bin 201B, the IC chip will be left in the first voltage bin 201A at process 608. However, if a determination is made at process 604 that the leakage power measurement of the IC chip is less than both the first leakage power screen value 501A of the first voltage bin 201A and the second leakage power screen value 501B of the second voltage bin 201B, the IC chip will be reassigned to the second voltage bin 201B at process 606.

Furthermore, when the selected IC chip is reassigned to the second voltage bin 201B, the processes described above can be iteratively repeated. That is, another determination can be made at process 602 as to whether or not there are any other slower voltage bins into which the selected IC chip could possibly be reassigned. If there were not any other slower voltage bins into which the selected IC chip could possibly be reassigned, the selected IC chip would be left in the second voltage bin 201B at process 608. However, in this case, the third voltage bin 201C, the fourth voltage bin 201D and so on are all possible candidates for bin reassignment. Thus, a determination can be made as to whether or not to reassign the selected IC chip from the second voltage bin 201B to the next slower voltage bin (i.e., to the third voltage bin 201C) based on a comparison of the third leakage power screen value 501C associated with the third voltage bin 201C to the leakage power measurement of the selected IC chip. Specifically, a determination is made at process 604 as to whether or not the leakage power measurement of the selected IC chip is greater than the third leakage power screen value 501C associated with the third voltage bin 201C. If so, the selected IC chip will be left in the second voltage bin 201B at process 608. However, if a determination is made at process 604 that the leakage power measurement of the selected IC chip is less than the third leakage power screen value 501C associated with the third voltage bin 201C, the selected IC chip can be reassigned to the third voltage bin 201C at process 606. Again, these processes can be iteratively repeated until no other slower voltage bins are available for possible reassignment or until a determination is made that, based on the leakage power measurement of the selected IC chip as compared to the leakage power screen value of the next slower voltage bin, the selected IC chip can not be further reassigned. Then, the same processes are repeated for each of the other manufactured IC chips.

It should be noted that the multiple different voltage bins 201A-201B, described above and illustrated in FIG. 2, can further be defined such that each voltage bin is associated with corresponding test parameters including, but not limited to, corresponding minimum test voltages (i.e., bin-specific minimum test voltages). Thus, for example, the first voltage bin 201A can be associated with first testing parameters (including, but not limited to, a first minimum test voltage), the second voltage bin 201B can be associated with second testing parameters (including, but not limited to, a second minimum test voltage that is higher than the first minimum test voltage), the third voltage bin 201C can be associated with third testing parameters (including, but not limited to, a third minimum test voltage that is higher than the second minimum test voltage) and so on. Each bin-specific minimum test voltage can, for example, be equal to the minimum voltage (Vmin) of the voltage range associated with the voltage bin (e.g., the Vmin of voltage range 301A for voltage bin 201A, the Vmin of voltage range 301B for voltage bin 201B, the Vmin of voltage range 301C for voltage bin 201C, and so on). Alternatively, in order to guarantee proper timing even during worst-case voltage drop events, the bin-specific minimum test voltage can be equal to the minimum voltage (Vmin) of the voltage range associated with the voltage bin, as described above, less some predetermined margin (also referred to herein as a guardband voltage).

The method can further comprise testing the IC chips using the testing parameters associated with the voltage bins to which they are finally assigned at process 112, taking into consideration any reassignment (114). Thus, for example, after reassigning a selected IC chip to the second voltage bin 201B from the first voltage bin 201A and further determining that the selected IC chip can not be further reassigned such that it remains in the second voltage bin 201B at process 608, the selected IC chip can be tested using the second testing parameters (e.g., the second minimum test voltage) as opposed to the first testing parameters (e.g., the first minimum test voltage) associated with the first voltage bin to which it was originally assigned. Similarly, after reassigning another selected IC chip to the third voltage bin 201C (e.g., from either the first voltage bin 201A or the second voltage bin 201B) and further determining that this selected IC chip can not be further reassigned such that it remains in the third voltage bin 201C at process 608, this selected IC chip can be tested using the third testing parameters (e.g., the third minimum test voltage) as opposed to the first testing parameters (e.g., the first minimum test voltage) or the second testing parameters (e.g., the second minimum test voltage) associated with the voltage bin to which the IC chip was originally assigned. Based on the results of such testing at process 114, a pass/fail determination can be made regarding the IC chips (i.e., the IC chips can be dispositioned) (116). That is, decisions can be made as to whether or not individual IC chips pass such that they can be shipped out to customers or fail such that they should be scrapped.

As a result of the pre-test bin reassignments made at process 112, IC chips, which would otherwise be tested at process 114 with lower minimum test voltages and have higher probabilities of failure due to low voltage sensitive-process variations, are now tested at higher minimum test voltages and have a lesser probability of failure due to low voltage sensitive-process variations. Thus, the pre-test bin reassignments made at process 112 can improve yield at test. Furthermore, since a selected IC chip can only be reassigned to a slower voltage bin at process 112 if the bin-specific leakage power screen value of the slower voltage bin is greater than the leakage power measurement of the selected IC chip, the bin reassigning process is said to be power-optimized. That is, it can only be made if the risk of violating the maximum total power constraint for the IC chips is minimal even in light of the higher voltage range that the selected IC chip will be subjected to if reassigned to slower voltage bin.

The methods as described above can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Also disclosed herein is a computer program product. The computer program product can comprise a computer readable storage medium having program instructions embodied therewith. The program instructions can be executable by a computer to cause the computer to perform the above-described method. More particularly, the present invention may be a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
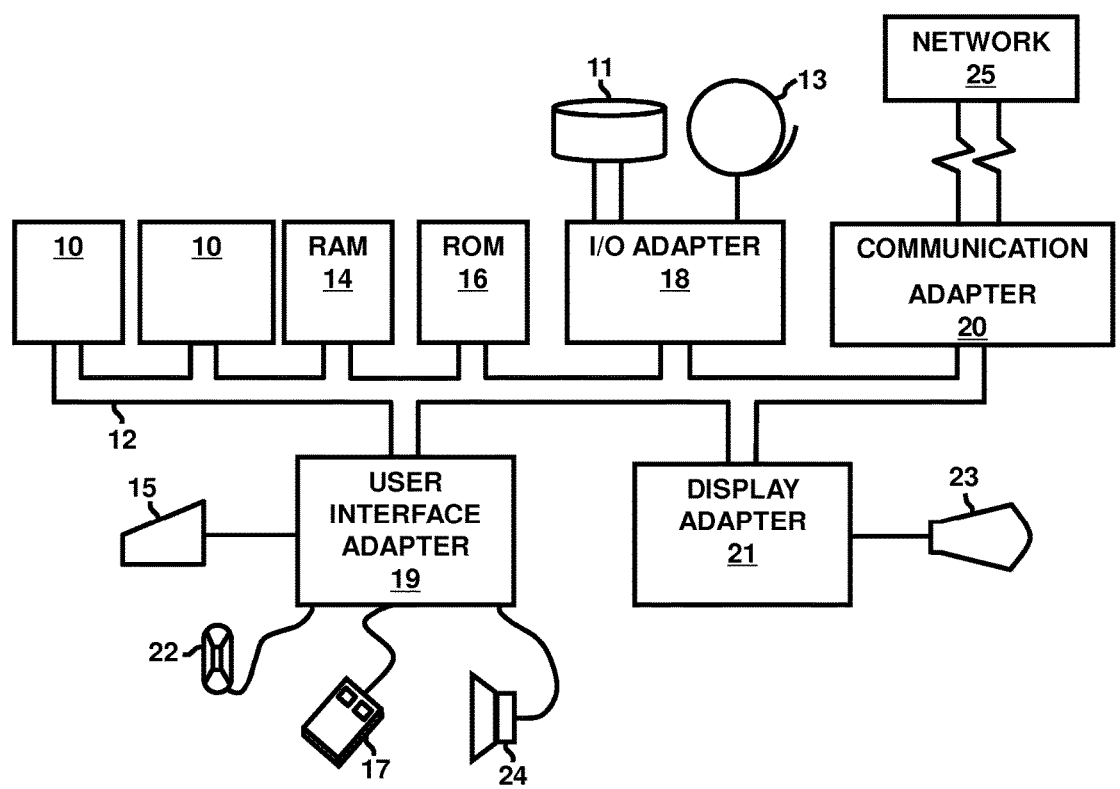

A representative hardware environment for practicing the method and computer program product of the embodiments of the invention is depicted in FIG. 7. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Disclosed above are a method and an associated computer program product for improving integrated circuit (IC) chip yield by providing for pre-test power-optimized bin reassignment following selective voltage binning. In the method, selective voltage binning and leakage power screening of IC chips manufactured according to a given design can be performed. Additionally, pre-test power-optimized bin reassignments can be made on an IC chip by IC chip basis. Specifically, a leakage power measurement of an IC chip selected from a voltage bin can be compared to the bin-specific leakage power screen value of the next slower voltage bin. If the leakage power measurement is higher, the IC chip will be left in the voltage bin to which it is currently assigned. If the leakage power measurement is lower, the IC chip can be reassigned to that next slower voltage bin. These processes can be iteratively repeated until no slower voltage bins are available or the IC chip cannot be reassigned. IC chips can subsequently be tested according to testing parameters, including the minimum test voltages, associated with the voltage bins to which they are finally assigned. Reassignment to slower voltage bins in this manner allows IC chips to be tested at higher minimum test voltages, while minimizing the risk of violating a maximum total power constraint.

What is claimed is:

1. A method comprising:
   performing selective voltage binning comprising assigning integrated circuit chips to voltage bins, said voltage bins comprising at least:
      a first voltage bin associated with a first performance range and a first leakage power screen value;
      a second voltage bin associated with a second performance range that is slower than said first performance range and a second leakage power screen value that is lower than said first leakage power screen value; and,
      a third voltage bin associated with a third performance range that is slower than said second performance range and a third leakage power screen value that is lower than said second leakage power screen value;
   reassigning an integrated circuit chip from said first voltage bin to said second voltage bin when a leakage power measurement taken from said integrated circuit chip is less than both said first leakage power screen value and said second leakage power screen value; and,
   after said reassigning of said integrated circuit chip from said first voltage bin to said second voltage bin, determining whether to further reassign said integrated circuit chip from said second voltage bin to said third voltage bin based on a comparison of said third leakage power screen value to said leakage power measurement,
   said integrated circuit chip being left in said second voltage bin when said leakage power measurement is equal to or greater than said third leakage power screen value, and
   said integrated circuit chip being reassigned from said second voltage bin to said third voltage bin when said leakage power measurement is less than said third leakage power screen value.

2. The method of claim 1,
   said first voltage bin being associated with first testing parameters, said second voltage bin being associated with second testing parameters and said third voltage bin being associated with third testing parameters, and said method further comprising:

when said integrated circuit chip is left in said second voltage bin, testing said integrated circuit chip using said second testing parameters; and, when said integrated circuit chip is reassigned to said third voltage bin, testing said integrated circuit chip using said third testing parameters.

3. The method of claim 2, said first testing parameters specifying a first minimum test voltage, said second testing parameters specifying a second minimum test voltage that is higher than said first minimum test voltage, and said third testing parameters specifying a third minimum test voltage that is higher than said second minimum voltage.

4. The method of claim 2, further comprising making a pass/fail determination regarding said integrated circuit chip based on results of said testing.

5. The method of claim 1, further comprising:
developing a design for said integrated circuit chips;
manufacturing said integrated circuit chip according to said design; and,
taking measurements from said integrated circuit chips, said measurements comprising at least performance measurements and leakage power measurements.

6. A computer program product comprising a non-transient computer readable storage medium having program instructions embodied therewith, said program instructions being executable by a computer to cause said computer to perform a method, said method comprising:
performing selective voltage binning comprising assigning integrated circuit chips having a same design to voltage bins, said voltage bins comprising at least:
a first voltage bin associated with a first performance range and a first leakage power screen value;
a second voltage bin associated with a second performance range that is slower than said first performance range and a second leakage power screen value that is lower than said first leakage power screen value; and,
a third voltage bin associated with a third performance range that is slower than said second performance range and a third leakage power screen value that is lower than said second leakage power screen value;
reassigning an integrated circuit chip from said first voltage bin to said second voltage bin when a leakage power measurement taken from said integrated circuit chip is less than both said first leakage power screen value and said second leakage power screen value; and,
after said reassigning of said integrated circuit chip from said first voltage bin to said second voltage bin, determining whether to further reassign said integrated circuit chip from said second voltage bin to said third voltage bin based on a comparison of said third leakage power screen value to said leakage power measurement, said integrated circuit chip being left in said second voltage bin when said leakage power measurement is equal to or greater than said third leakage power screen value, and said integrated circuit chip being reassigned from said second voltage bin to said third voltage bin when said leakage power measurement is less than said third leakage power screen value.

7. The computer program product of claim 6,
said first voltage bin being associated with first testing parameters and said second voltage bin being associated with second testing parameters, and
said method further comprising, after reassigning said integrated circuit chip from said first voltage bin to said second voltage bin, testing said integrated circuit chip using said second testing parameters.

8. The computer program product of claim 7, said first testing parameters specifying a first minimum test voltage and said second testing parameters specifying a second minimum test voltage that is higher than said first minimum test voltage.

9. The computer program product of claim 7, said method further comprising making a pass/fail determination regarding said integrated circuit chip based on results of said testing.

10. The computer program product of claim 6, said method further comprising:
developing a design for said integrated circuit chips;
manufacturing said integrated circuit chip according to said design; and,
taking measurements from said integrated circuit chips, said measurements comprising at least performance measurements and leakage power measurements.

11. The computer program product of claim 6, said method further comprising, before said determining of whether to reassign said integrated circuit from said first voltage bin to said second voltage bin, determining whether to scrap said integrated circuit chip based on said comparison of said first leakage power screen value to said leakage power measurement.

* * * * *

UNITED STATES PATENT AND TRADEMARK OFFICE
CERTIFICATE OF CORRECTION

| | |
|---|---|
| PATENT NO. | : 9,759,767 B2 |
| APPLICATION NO. | : 14/695112 |
| DATED | : September 12, 2017 |
| INVENTOR(S) | : Igor Arsovski et al. |

It is certified that error appears in the above-identified patent and that said Letters Patent is hereby corrected as shown below:

On the Title Page

(71) Applicant should read: GLOBALFOUNDRIES INC., Grand Cayman (KY)

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*